B. F. BERRY.
PAPER PERFORATING DEVICE.
APPLICATION FILED OCT. 3, 1910.
1,000,228.
Patented Aug. 8, 1911.
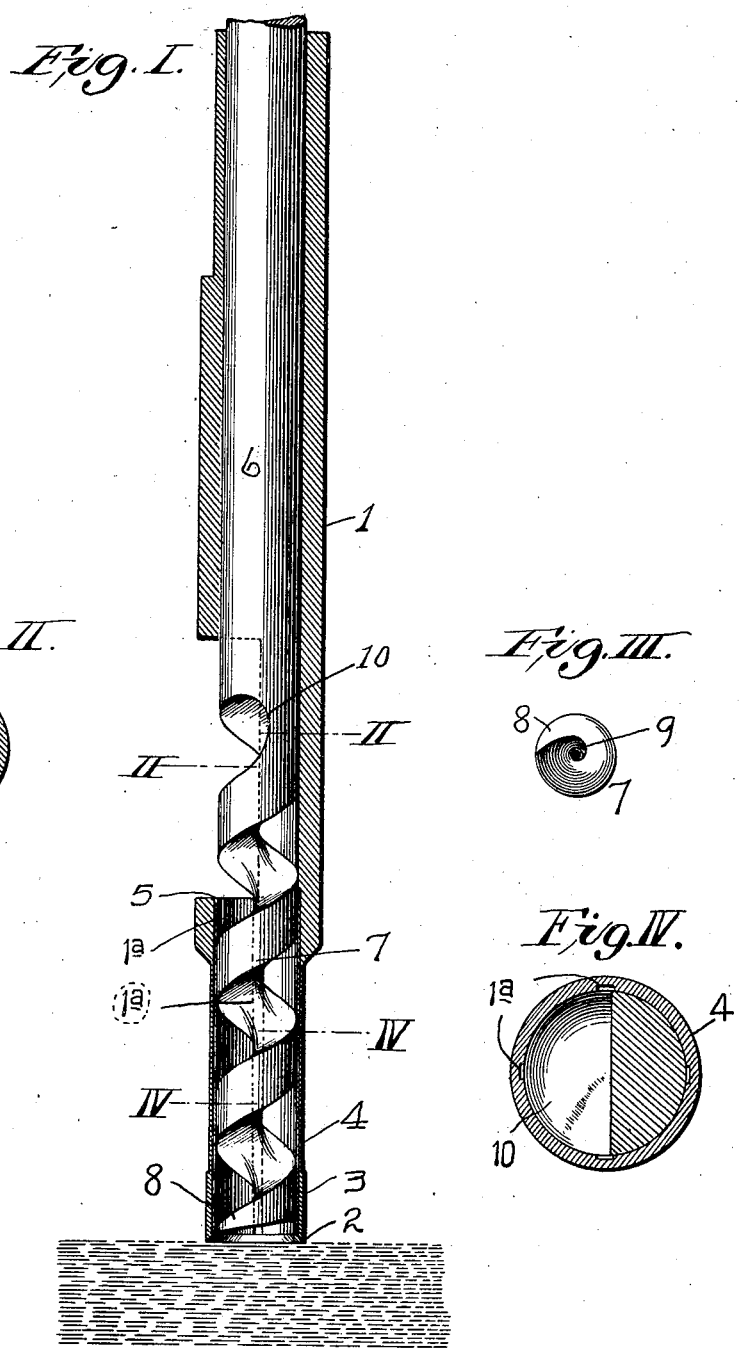

UNITED STATES PATENT OFFICE.

BENJAMIN F. BERRY, OF ST. LOUIS, MISSOURI.

PAPER-PERFORATING DEVICE.

1,000,228. Specification of Letters Patent. Patented Aug. 8, 1911.

Application filed October 3, 1910. Serial No. 585,037.

*To all whom it may concern:*

Be it known that I, BENJAMIN F. BERRY, a citizen of the United States of America, residing in the city of St. Louis and State of Missouri, have invented certain new and useful Improvements in Paper-Perforating Devices, of which the following is a full, clear, and exact description, reference being had to the accompanying drawings, forming part of this specification.

My invention relates to a device for perforating a mass of sheets of paper, and it has for its object the production of a device of this description having a hollow cutter whereby the paper may be perforated and efficient means whereby the cut-out particles of paper may be gradually conveyed from the cutter without becoming clogged therein.

I am aware that attempts have heretofore been made to produce perforators of the description mentioned, but in so far as I am aware, these perforators have not proven satisfactory for the reason of defects therein, and which by my improvement I have overcome, with the result of furnishing a highly efficient perforator, and one that may be operated with speed without the least clogging action in the performance of its office.

Figure I is a view showing the hollow cutter of my perforator in longitudinal section, and the auger of the perforator in elevation, the parts being illustrated in the position assumed during perforating operation. Fig. II is a cross section taken on irregular line II—II, Fig. I. Fig. III is an end view of the auger of my perforator. Fig. IV is a cross section taken on irregular line IV—IV, Fig. I.

In the accompanying drawings: 1 designates the hollow cutter of my perforator which is provided at its working end with a circular knife or cutting edge 2. The cutting edge 2 is located at the extremity of the hollow cutter upon a cylindrical terminal portion 3 that corresponds in diameter to the diameter of the hole that is to be cut in the operation of my perforator.

The cutter is reduced in diameter at 4, immediately above the terminal portion 3 to provide clearance at this point around the working portion of the cutter, and between it and the material in which it operates, with the object in view of reducing the friction between the cutter and the material being perforated. At 5 is an escape opening through which the cut-out material may escape.

6 designates a discharge auger operable in the hollow cutter 1, and by which the cut-out material occupying the hollow cutter is picked up and conveyed upwardly from the cutting end of the hollow cutter to the escape opening 5, the auger being so arranged within the hollow cutter as to have its extremity located above the cutting edge 2 to pick up the material as it is cut without entering into and tearing it. The conveyer portion 7 of the auger 6 is of corkscrew form and terminates at its extremity in a single lip 8 that is inclined both at its lower and upper faces, in order that it may readily pass beneath the material that is perforated by the cutting edge of the cutter 1, and cause this material to be properly started in an upward direction through the spiral way of the auger.

A very important feature in the construction of the spiral of the auger is that the final turn of this spiral, which carries the lip 8, is cut away at 9 (see Fig. III) so that the entire lip is offset from the axial line through the auger. Thus cutting away of the spiral of the auger at the point referred to is done for the double purpose of locating said lip only at the circumference of the spiral and of permitting the material cut by the cutter 4, and entering thereinto, to readily pass upwardly into the spiral way in the auger, which it could not do without clogging action if the final turn of the spiral were continued so it would be in part in the axial line through the auger.

Another important feature in my auger is that of providing a cut-out 10 at the upper end of the spiral of the auger so that the uppermost turn of the spiral is rendered of greater width than the width of the remainder of the spiral way, and consequently wider than the stream of cut-out material that ascends through the spiral way when the cutter is in operation. This feature of the construction provides for the cut-out material becoming readily dislodged from the spiral way in the auger as it reaches the upper end of said spiral way, so that it flows out of the cutter as rapidly as it is elevated through the spiral way.

In the practical use of my perforator, both the hollow cutter 1 and the auger 6 are rotated, the cutter being rotated in one direction while the auger is rotated in the opposite direction to elevate the material that is cut out by the hollow cutting member and discharge it therethrough when it has been elevated to the escape opening 5.

It not infrequently happens in the use of a paper perforator comprising a hollow cutter and an auger operable therein, as is the case in my perforator, that the pieces of paper cut and fed into the hollow cutter become clogged or wedged in the spiral of the auger so that they remain in a fixed position instead of being fed by the auger as it is intended they should be. To overcome this clogging in the operation of my perforator, I provide the portion of the hollow cutter extending upward from its cutting edge with grooves 1$^a$. There are preferably a plurality of such grooves extending longitudinally interiorly of the part of the cutter referred to, from a point adjacent to the cutting edge of the cutter to the escape opening 5. During the operation of the perforator, the pieces of paper cut by the cutter 1 move into the cutter, and these pieces enter partially into the grooves 1$^a$, with the result that the grooves serve as guideways for the material, so that as the material is operated upon by the auger, it will be effectually carried through the cutter instead of being permitted to turn therein and not be carried to the escape opening 5 as it should be.

I am aware that it is not new to produce a boring device in which there is a hollow cutter and an auger operable in said hollow cutter and, therefore, do not broadly claim a combination of such features. In the boring tools of the kind referred to as heretofore produced, the auger is a boring implement and is, therefore, provided with means at its terminus that causes it to cut or bore into the material that is operated upon by the tool, the auger being commonly provided with two cutting lips, both of which are adapted to become embedded in the material to be bored. Tools of this nature may possibly be employed advantageously in boring wood, but they would be utterly useless in perforating sheets of paper which is the material my perforating device is intended to operate upon. If an attempt were made to use such instruments in perforating paper, the paper being soft in nature would be torn in a ragged manner and would very clearly become clogged in the hollow cutter in such degree as to utterly defeat perforating action through the paper by the tool.

My perforating device differs very materially from cutters of the kind heretofore produced, and to which reference has been made, in that the auger of the device is not in any sense a boring implement, but is only a conveyer by which the particles of sheets of paper punched by the hollow cutter are picked up and conveyed through said hollow cutter without there being any entrance of the auger into the paper to tear it and produce such a mass as would clog the passageway through the hollow cutter. This result is due to the fact of the conveyer auger being of corkscrew shape and terminating in a single lip 8 offset from the axis of the cutter and which, by reason of its particular location at the circumference of the auger, is enabled to pass beneath the particles of sheets of paper as they are punched out by the hollow cutter to lift them as rapidly as they are punched out with the result of such punched out particles being delivered through the hollow cutter in a continuous series. The particles being thin bend readily to permit of their passage in the spiral of the auger and, as a consequence, there is no tendency toward clogging of the spiral way as will be obvious.

I claim:

1. In a perforator, a hollow cutter member having a circular cutting edge, and an auger of corkscrew shape operable in said cutter member, the spiral of which terminates in a single lip arranged diagonally relative to and offset from the axial line of the auger.

2. In a perforator, a hollow cutter member having a circular cutting edge, and an auger of corkscrew shape operable in said cutter member, the spiral of which terminates wholly in a single lip arranged diagonally relative to and offset from the axial line of the auger; said auger having the final turn of its spiral cut away at the axial line of the auger.

3. In a perforator, a hollow cutter member having a circular cutting edge, and an auger of corkscrew shape operable in said cutter member, the spiral of which terminates wholly in a single lip arranged diagonally relative to and offset from the axial line of the auger; said auger having the upper turn of its spiral cut away at the axial line of the auger.

4. In a perforator, a hollow cutter having at one end a terminal portion provided with a circular cutting edge and provided with an escape opening intermediate of its ends, the said cutter being of reduced external diameter above said terminal portion to provide clearance between the cutter and the material perforated after a perforation has been partially produced.

BENJAMIN F. BERRY.

In the presence of—
H. G. COOK,
M. C. HAMMON.